(No Model.)
J. C. HERMAN.
MANUFACTURE OF VISE HEADS.
No. 352,322. Patented Nov. 9, 1886.
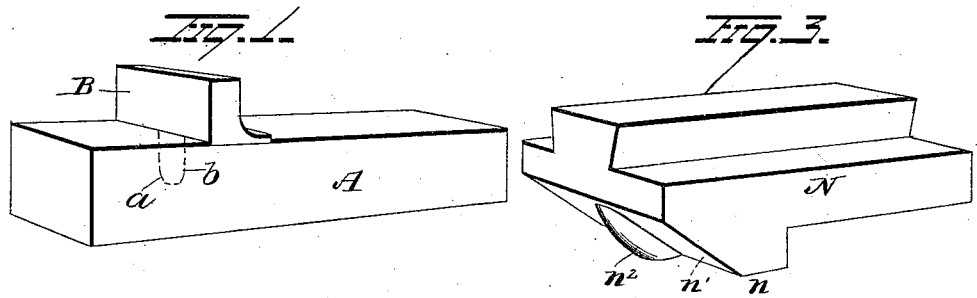
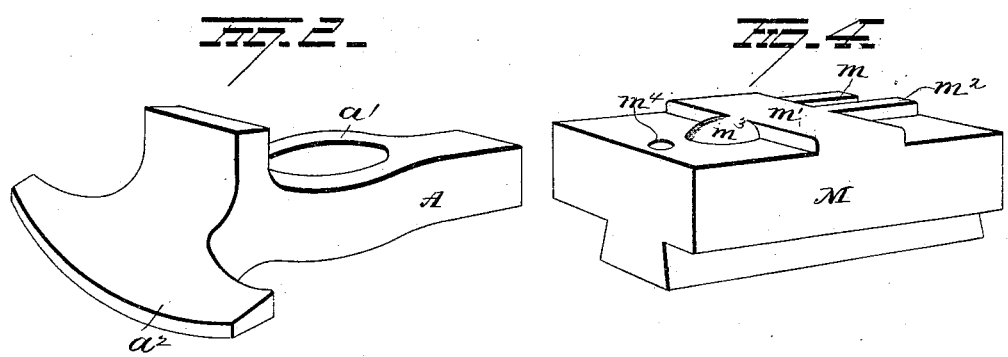
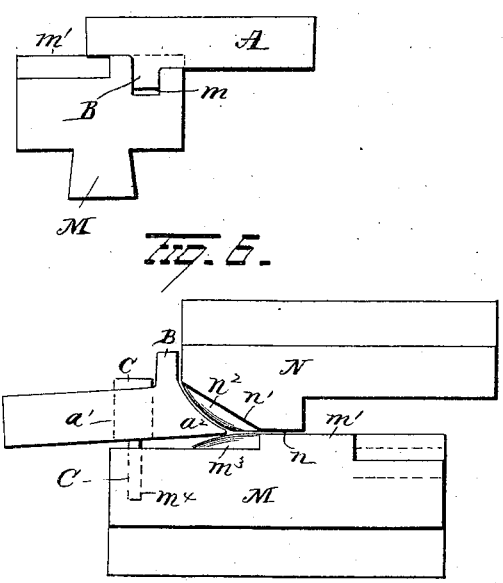
WITNESSES
INVENTOR
John C. Herman.
By Leggett & Leggett
Attorney

UNITED STATES PATENT OFFICE.

JOHN C. HERMAN, OF ST. LOUIS, MISSOURI, ASSIGNOR OF ONE-HALF TO FRANK KREIN, JR., OF SAME PLACE.

MANUFACTURE OF VISE-HEADS.

SPECIFICATION forming part of Letters Patent No. 352,322, dated November 9, 1886.

Application filed May 24, 1886. Serial No. 203,093. (No model.)

*To all whom it may concern:*

Be it known that I, JOHN C. HERMAN, of St. Louis, in the county of St. Louis and State of Missouri, have invented certain new and useful Improvements in Manufacture of Vise-Heads; and I do hereby declare the following to be a full, clear, and exact description of the invention, such as will enable others skilled in the art to which it pertains to make and use the same.

My invention relates to an improvement in the manufacture of vise-heads.

The object is to provide an improved method of forming what is commonly called the "jet" on the back of the head and of fulling the head, whereby a strong head may be formed at a minimum outlay of time and expense.

A further object is to provide dies adapted to carry into effect the above method.

With these ends in view my invention consists in first securing the jet to the blank or mold by a plug or its equivalent, then shaping the jet in a die or mold, and, thirdly, fulling the head between dies of peculiar shape.

My invention further consists in a pair of dies, one of them provided with a groove adapted to shape the jet during the welding process, and adapted to combinedly spread the head of the blank or mold into the shape for finishing.

My invention further consists in certain features of construction and combinations of parts, as will be hereinafter described, and pointed out in the claims.

In the accompanying drawings, Figure 1 is a view of the blank or mold with the jet plugged thereto. Fig. 2 is a view of the same after the jet has been welded thereto, the head fulled or spread out, and the opening formed therein. Figs. 3 and 4 represent, respectively, the upper and lower dies. Fig. 5 represents the blank or mold in position on the lower die during the process of welding, and Fig. 6 represents the same in the position it occupies while the head is being spread.

A represents the blank or mold, which consists of a bar of iron or steel of the size and weight adapted to the construction of a vise-head of the desired size and strength. A hole, $a$, is punched in the blank A, and the jet B, provided with a plug, $b$, forged thereon or set therein, is secured to the side of the blank by inserting the plug $b$ in the hole $a$. The blank or mold A, with the jet attached, is then placed on the lower die, M, with the jet B in the slot $m$, formed in the face of the groove, as shown. In this position it is submitted to a welding heat, and while hot the upper die, N, is brought down into contact therewith, shaping the jet B by forcing it to fill the slot $m$, and the opening $a'$ in the blank or mold is formed by a punch, or in any other well-known or approved manner. The blank or mold A, with the jet welded thereto and the opening $a'$ formed therein, is then placed between the two dies and operated upon as follows: The lower die is provided across its central portion with a smooth face, $m'$, raised above the remainder of the face, with the exception of the narrow portion $m^2$, forming a portion of one of the walls of the slot $m$, and the round-faced projection $m^3$, which I shall refer to as one of the "fullers." It is located at the central portion of the edge of the raised face $m'$, and extends at right angles to said edge in a taper form down to a point at the main surface of the die. The lower die is further provided with a hole, $m^4$, in its upper face near its front end, in which a pin, C, is adapted to fit. The upper die is provided near its front end with a raised face, $n$, corresponding to the face $m'$ on the lower die, and from the front edge of the face $n$ to the front end of the die the latter is beveled, as shown at $n'$. A rounded pointed projection, $n^2$, is centrally located in the beveled portion $n'$ in a position directly above the projection $m^3$ and forms the other fuller.

The blank or mold is held in position on the lower die by means of the pin C, which extends down through the opening $a'$ and into the hole $m^4$. The head of the pin is preferably enlarged, as shown, to fit loosely within the opening $a'$, and the blank, while thus held in position, is capable of being swung around on the pin C as a pivot, and the head $a^2$, located between the dies, brought into new positions relative to the fullers. The approach of the fullers toward each other presses the metal in the head gradually outwardly to the right and left somewhat after the manner of kneading dough, and by swinging the head to the right and left the fullers are made to act upon the portions of the head to the right and left of the center, gradually spreading the metal out into the desired shape. The action of the fullers upon the metal is a combined draw and pressure stroke, and the metal is thereby reduced to the desired shape without losing its coherence and strength.

The vise-head as thus shaped is ready for the finishing process, which may consist of any well-known steps and need not be herein described, as it forms no part of my present invention.

Having fully described my invention, what I claim as new, and desire to secure by Letters Patent, is—

1. An improvement in the art of making vise-heads, consisting in first plugging the jet to the blank; secondly, shaping the jet in a die and simultaneously welding it to the blank, and, thirdly, spreading the head, substantially as set forth.

2. In devices for the manufacture of vise-heads, the combination, with a lower die provided with a hole adapted to receive a pivotal bolt or pin for holding and manipulating the blank on the die, of an upper die acting in conjunction with the lower die for shaping the head, substantially as set forth.

3. In devices for the manufacture of vise-heads, the combination, with the upper die provided with the beveled face having the fuller raised therefrom, of the lower die acting in conjunction with the upper die, substantially as set forth.

4. In devices for the manufacture of vise-heads, the combination, with the lower die having the fuller formed on the upper face thereof, and devices for loosely securing the blank thereto, of the upper die having the fuller formed on the lower face thereof, the said fullers adapted to work on the blank with a combined draw and pressure stroke, substantially as set forth.

In testimony whereof I have signed this specification in the presence of two subscribing witnesses.

JOHN C. HERMAN.

Witnesses:
EDWARD A. PRIMEAU,
FREDERICK W. HUNN.